United States Patent
Walley et al.

(10) Patent No.: US 8,203,977 B2
(45) Date of Patent: Jun. 19, 2012

(54) METHOD AND SYSTEM FOR HALF DUPLEX AUDIO IN A BLUETOOTH STEREO HEADSET

(75) Inventors: John Walley, Ladera Ranch, CA (US); Ash Kapur, Frederick, MD (US)

(73) Assignee: Broadcom Corporation, Irvine, CA (US)

( * ) Notice: Subject to any disclaimer, the term of this patent is extended or adjusted under 35 U.S.C. 154(b) by 186 days.

(21) Appl. No.: 12/181,103

(22) Filed: Jul. 28, 2008

(65) Prior Publication Data

US 2010/0020729 A1    Jan. 28, 2010

(51) Int. Cl.
*H04B 7/00*    (2006.01)
*H04W 4/00*    (2009.01)
*H04J 3/06*    (2006.01)

(52) U.S. Cl. .......... 370/277; 370/341; 370/350

(58) Field of Classification Search .......... None
See application file for complete search history.

(56) References Cited

U.S. PATENT DOCUMENTS

| | | | |
|---|---|---|---|
| 2002/0172185 A1* | 11/2002 | Mito et al. | 370/347 |
| 2004/0120341 A1* | 6/2004 | Hur et al. | 370/442 |
| 2004/0192222 A1* | 9/2004 | Vaisanen et al. | 455/78 |
| 2005/0020299 A1* | 1/2005 | Malone et al. | 455/552.1 |
| 2007/0076961 A1* | 4/2007 | Shiiyama | 382/232 |
| 2007/0143105 A1* | 6/2007 | Braho et al. | 704/231 |
| 2007/0197256 A1* | 8/2007 | Lu et al. | 455/552.1 |
| 2008/0101279 A1* | 5/2008 | Russell et al. | 370/328 |
| 2008/0123610 A1* | 5/2008 | Desai et al. | 370/339 |
| 2008/0207126 A1* | 8/2008 | Grushkevich et al. | 455/41.2 |
| 2008/0233875 A1* | 9/2008 | Desai et al. | 455/41.2 |
| 2009/0061775 A1* | 3/2009 | Warren et al. | 455/41.2 |

* cited by examiner

*Primary Examiner* — Clemence Han
(74) *Attorney, Agent, or Firm* — Thomas, Kayden, Horstemeyer & Risley, LLP (57) ABSTRACT

Aspects of a method and system for half duplex audio in a Bluetooth stereo headset are provided. A service type and/or service activity levels may be detected over a link in a duplex communication system. The link may be dynamically changed according to the detected service activity levels in both direction of the link. The duplex communication system may be a communication system capable of supporting duplex communication, for example, a Bluetooth system, a 3GPP system, a WiMAX system, or a WiFi system. The link may be a synchronous connection-oriented (SCO) link such as the SCO link. The duplex communication system may be enabled to determine an operating mode, whether symmetric or asymmetric, based on the detected service type and/or the detected service activity levels over the SCO link. In this regard, the SCO link may be dynamically switched from symmetric to asymmetric operating mode and vice versa.

30 Claims, 9 Drawing Sheets

METHOD AND SYSTEM FOR HALF DUPLEX AUDIO IN A BLUETOOTH STEREO HEADSET

CROSS-REFERENCE TO RELATED APPLICATIONS/INCORPORATION BY REFERENCE

Not Applicable.

FIELD OF THE INVENTION

Certain embodiments of the invention relate to wireless communication. More specifically, certain embodiments of the invention relate to a method and system for half duplex audio in a Bluetooth stereo headset.

BACKGROUND OF THE INVENTION

Bluetooth is a low-power, short-range wireless networking standard designed for local area voice and data transfer. Bluetooth radios operate in the unlicensed ISM band at 2.4 GHz with a set of 79 hop carriers with 1 MHz spacing. A master-slave communication model with frequency hopping spread spectrum (FHSS) transmission technique is adopted in the Bluetooth specification to ensure protection from interference and security of data. A collection of Bluetooth devices may be connected in an Ad Hoc fashion. The Bluetooth devices may connect to each other to form a network known as a piconet. One Bluetooth device may act as a master of the piconet, whereas the other devices may act as slaves. At the maximum, 8 active Bluetooth devices may participate in the one piconet. Time may be divided into slots of 625 us in the piconet. The master and slaves may alternate transmit opportunities in a time-division duplex (TDD) fashion. In particular, the master may transmit on available even numbered slots, as defined by the master's Bluetooth clock, while the slaves may transmit on available odd numbered slots. The master controls formation of Bluetooth communication links and communication procedures with slaves within the piconet. A slave may transmit only after being polled by the master.

Bluetooth supports various types of radio communication links including a Synchronous Connection-Oriented (SCO) link that reserves predetermined time slots on the time axis, and an Asynchronous Connection-less (ACL) link that randomly uses time slots on the time axis for communications. The ACL link is a so-called packet switching radio communications link where transmissions may be allowed in the slots not reserved for SCO links. The SCO link defined in the Bluetooth specification provides a full-duplex symmetric link between the master and a slave with reserved time slots. A data rate of 64 kbps is provided in both directions of the SCO link. The master transmits SCO packets in reserved master-to-slave SCO slots to the slave at regular SCO interval Tsco (counted in slots), and the slave is allowed to respond with SCO packets in reserved slave-to-master SCO slots even if the slave may not successfully decode the master's packet in the previous time slot. The slave-to-master SCO slots may directly follow the reserved master-to-slave SCO slots. No SCO packet retransmission occurs over the SCO link.

Bluetooth supports various types of SCO packets including HV1, HV2 and HV3. The SCO packets are typically used for 64 kb/s speech transmission with a fixed payload length of 240 bits. They differ from each other in terms of forward error correction code (FEC) rate used, for example, a rate ⅓ FEC is used for HV1 packet, a rate ⅔ FEC is used for HV2 packet, and no FEC is used for HV3 packet. A different SCO interval Tsco value may apply according to different SCO packet type. For example, Tsco=2 slots for HV1 packet, Tsco=4 slots for HV2 packet, and Tsco=6 slots for HV3 packet.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method is provided for half duplex audio in a Bluetooth stereo headset, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for half duplex audio in a Bluetooth stereo headset. Various aspects of the invention may comprise dynamically managing a SCO link based on a service type and/or service activity levels in an associated direction of the SCO link. The service type and the service activity levels may be detected and accessed by a master Bluetooth device, for example, a Bluetooth enabled cell phone. According to the received information regarding the service type and/or the service activity levels, the master Bluetooth device may select corresponding SCO parameters such as a SCO interval, SCO packet size and reserved time slots. The SCO link may be confirmed and updated based on the selected SCO parameters. Communication may continue over the updated SCO link. In accordance with various embodiments of the invention, the Bluetooth stereo headset may be coupled with an audio detector or a call button to signal the Bluetooth enabled device of service activity information.

In accordance with various embodiments of the invention, the service type and/or the service activity levels may be detected over a link in a duplex communication system. The link may be dynamically changed according to the detected service activity levels in both direction of the link. The duplex communication system may be a communication system capable of supporting duplex communication, for example, a Bluetooth system, a 3GPP system, a WiMAX system, or a WiFi system. The link may be a synchronous connection-oriented (SCO) link such as the SCO link. The duplex communication system may be enabled to determine an operating mode, whether symmetric or asymmetric, based said detected service type and/or said detected service activity levels over the SCO link. In this regard, the SCO link may be dynamically switched from symmetric to asymmetric operating mode and vice versa.

Figure 1:
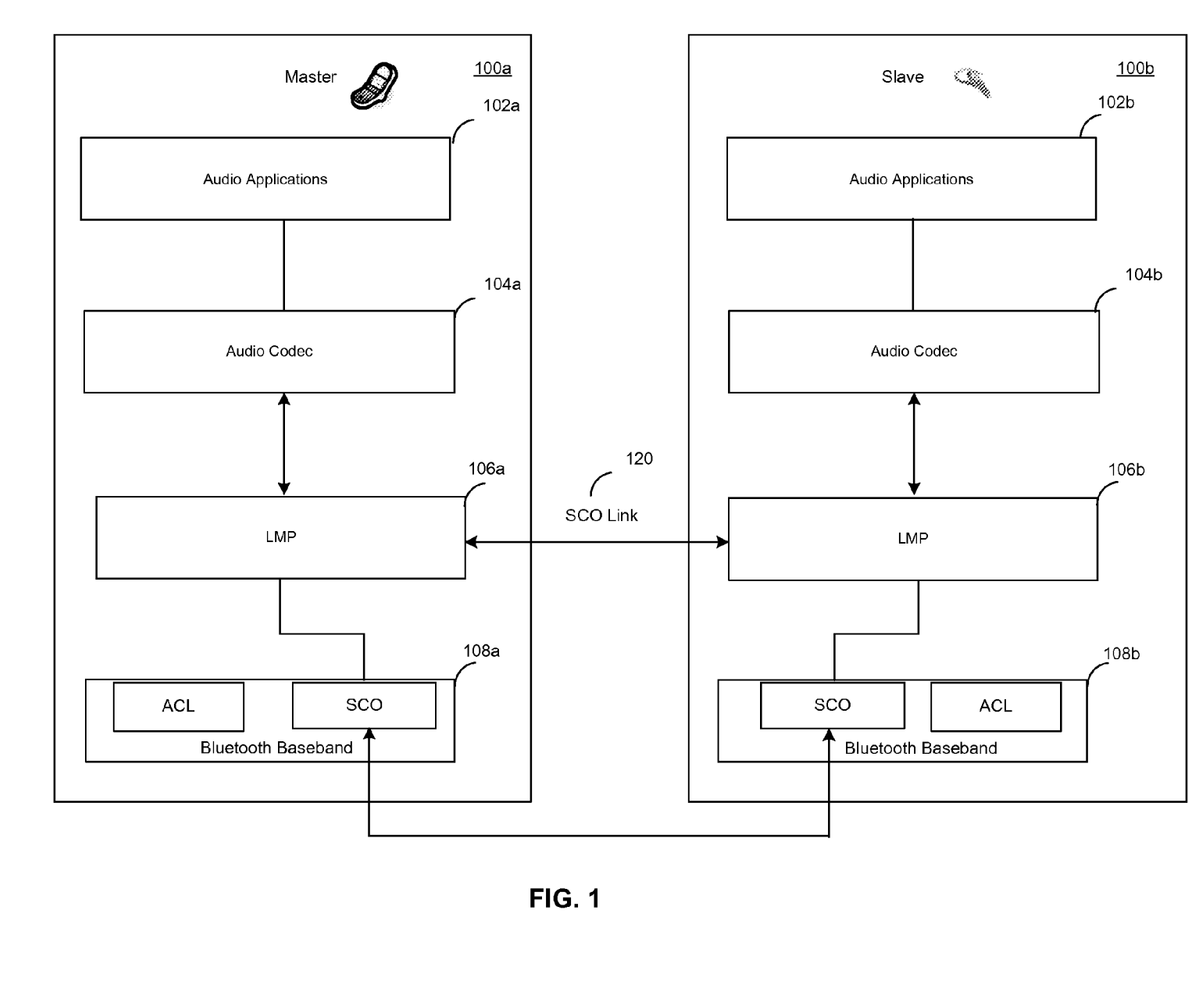
FIG. 1 is an exemplary Bluetooth protocol stack, in accordance with an embodiment of the invention.

FIG. 1 is an exemplary Bluetooth protocol stack, in accordance with an embodiment of the invention. Referring to FIG. 1, there is shown a Bluetooth enabled cell phone as a master 100a and a Bluetooth stereo headset as a slave 100b. The exemplary Bluetooth protocol stack of the Bluetooth enabled cell phone 100a and the Bluetooth stereo headset 100b may comprise audio applications 102, an audio codec 104, a link manager (LMP) 106, and a Bluetooth baseband 108.

The audio applications 102 may comprise both legacy and new wireless audio applications to exchange audio information using the Bluetooth wireless technology, for example, Bluetooth stereo headsets, and wireless MP3 & digital audio.

The audio codec 104 may comprise suitable logic circuitry and/or code that may be enabled to perform analog/digital conversions and bit stream coding/decoding to create audio radio in a Bluetooth supported format. The Bluetooth air-interface may support a 64 kb/s log PCM format such as A-law or μ-Law, and a 64 kb/s CVSD (Continuous Variable Slope Delta Modulation). A-Law and μ-Law may be the logarithmic voice encodings, while CVSD may be resistant to bit errors and result in a robust voice encoding format. The CVSD may be the most common encoding format in Bluetooth enabled devices.

The link manager protocol (LMP) 106 may be responsible for the link setup between Bluetooth enabled devices such as the Bluetooth enabled cell phone 100a and the Bluetooth stereo headset 100b. The LMP 106 may enable, for example, link setup, link configuration, authentication, QoS, and/or data rate adjustment. The LMP 106 may also be enabled to handle control and/or negotiation of packet sizes for the Bluetooth baseband 108.

The Bluetooth baseband 108 may comprise suitable logic circuitry and/or code that may be enabled to manage Bluetooth radio hardware and may comprise the Bluetooth link layer and part of the physical layer. The Bluetooth baseband 108 may define various procedures that may enable Bluetooth enabled devices to communicate with each other using the Bluetooth wireless technology. The Bluetooth baseband 108 may control a manner in which transmission resources may be shared among several Bluetooth enabled devices, as well as the low-level packet types.

The SCO link 120 may be a physical link between the Bluetooth enabled cell phone (the master) 100a and the Bluetooth stereo headset (the slave) 100b. The SCO link 120 may be used primarily for time sensitive data communication such as audio applications in which latency may be a rigid specification for a reasonable QoS. The SCO link 120 may be established through the LMP 106, for example, a LMP_SCO_req. The LMP_SCO_req may comprise SCO parameters such as, for example, an SCO handle, an SCO interval (Tsco), an SCO delay (Dsco), an SCO packet type to use, an audio format (A-law or μ-Law or CVSD). The SCO handle may be an 8-bit unsigned integer identifying the particular SCO link 120 from other SCO links. The Dsco may specify when the first SCO packet may take place over the SCO link 120. The SCO interval (Tsco) may define how often SCO packets are to be exchanged over the SCO link 120. The beginning of the next master-to-slave SCO slot may be found by adding the Tsco to the current master-to-slave SCO slot time.

Once the SCO link 120 may be established, specified slots (slave-to-master SCO slots) may be reserved. The slave-to-master SCO slots may directly follow the reserved master-to-slave SCO slots. The LMP 106 may change SCO parameters while the SCO link 120 may be operational. This may enable, for example, configuring the SCO link 120 on a needed basis, including the SCO packet type changes, the SCO interval Tsco changes, reserved slots changes, QoS changes, and power level changes, to better match, for example, service type and service activity level in each direction of the SCO link 120, and improve bandwidth efficiency.

In an exemplary embodiment of the invention, a voice call may be made over the SCO link 120 between the Bluetooth enabled cell phone (the master) 100a and the Bluetooth headset (the slave) 100b. The voice call may be generally a two-way communication with separate bandwidth required for each direction. During the call, at least one of two speakers may be silent most of the time and sometime both the speakers may be silent. As a result more than half the time, bandwidth allocated to the call for one direction may remain unused. According to embodiments of present invention, bandwidth may be conserved by dynamically managing the SCO link 120 based on a service type and service activity level in each of the two directions of the SCO link 120.

In the preceding exemplary embodiment of the invention where, there may be a voice call over the SCO link 120, the master-to-slave SCO slots and the slave-to-master SCO slots may be reserved according to voice activity levels in corresponding direction of the SCO link 120. The SCO packets may be transmitted only in reserved SCO slots. In this regard, the frequency of slot reservation or the time period between consecutive voice slots may be controlled through an adaptive Tsco depending on the voice activity of the call. The Tsco may toggle among a plurality of distinct values with changes in voice activity of the call. A look-up table comprising a mapping between the Tsco values and voice activity levels may be stored in the Bluetooth enabled cell phone (the master) 100a. The mapping between the Tsco values and voice activity levels may be vender specific. Bandwidth efficiency may be further improved by adjusting bandwidth allocated based on characteristics of the voice call, for example, the detection of silent periods of the human voice. In this regard, the SCO packet size may be dynamically adjusted based on the voice activity level. During a silent period, the SCO packets may only contain silence information such as a noise signature to maintain system synchronization and corresponding bandwidth allocated for the SCO packets may be reduced accordingly. In this regard, a reduced coding rate may be used during silence periods in speech.

Some of the Bluetooth baseband 108 associated with the SCO link 120 may shut down when the SCO link 120 may operate in, for example, a half duplex mode. The power consumption of, for example, the Bluetooth headset, may be saved accordingly. The present invention may reduce the energy consumption of Bluetooth enabled devices while securing quality of data transmission. For the same amount of energy, various embodiments of the invention may provide a much higher quality of data transmission than with conventional Bluetooth.

In operation, the Bluetooth headset (the slave) 100b may be initialized to an active slave mode, waiting for a connection request from the Bluetooth enabled cell phone (the master) 100a or sending the connection request to the Bluetooth enabled cell phone (the master) 100a. The SCO link 120 may be established by the Bluetooth enabled cell phone (the master) 100a sending an SCO setup message to the Bluetooth headset (the slave) 100b via the LMP 106. Once the SCO link 120 has been confirmed by both the Bluetooth enabled cell phone (the master) 100a and the Bluetooth stereo headset (the slave) 100b, an active conversation may take place over the SCO link 120.

In an exemplary embodiment of the invention where there is master-to-slave voice traffic, an audio application packet may be generated or received at the audio application 102a and communicated to the audio codec 104a. The audio codec 104a may encode the received audio packet to a format supported by Bluetooth. The output of the audio codec 104a may be a 64 kbps stream to be reassembled to SCO packets with a length of voice field. In this regard, the length of the voice field may be determined based on a voice activity level in the master-to-slave direction of the SCO link 120. The SCO packets may be communicated to the LMP 106a. The LMP 106a may carry out link authentication, link configuration and other protocols corresponding to the received SCO packets. The Bluetooth baseband 108a may transmit the SCO packets designated for the Bluetooth stereo headset (the slave) 100b over the established SCO link 120 at a SCO interval Tsco. In this regard, the SCO interval Tsco may be dynamically adjusted depending on the voice activity level in the master-to-slave direction of the SCO link 120. The Bluetooth baseband 108b of the Bluetooth stereo headset (the slave) 100b may recover the SCO packets from the Bluetooth enabled cell phone (the master) 100a and pass to the LMP 106b. The LMP 106b may interpret and filter the received SCO packets based on, for example, device link security settings and other link configuration. The LMP 106 may then output the filtered SCO packets to the audio codec 104b. The audio codec 104b may decode the received SCO packets to form an application service data unit (SDU) at the audio applications 102b. The Bluetooth stereo headset (the slave) 100b may be allowed to respond with a SCO packet in reserved response slots depending on a voice activity level in the slave-to-master direction of the SCO link 120. In this regard, the Bluetooth stereo headset (the slave) 100b may be enabled to detect voice activity level in both directions of the SCO link 120. The Bluetooth stereo headset (the slave) 100b may convey the corresponding information to the Bluetooth enabled cell phone (the master) 100a through a LMP message over an ACL link associated to the SCO link 120. The Bluetooth enabled cell phone (the master) may modify the SCO link by adjusting the SCO interval Tsco, and/or adjusting slot reservation and/or SCO packet sizes over the SCO link 120 in both directions accordingly.

Figure 2A:
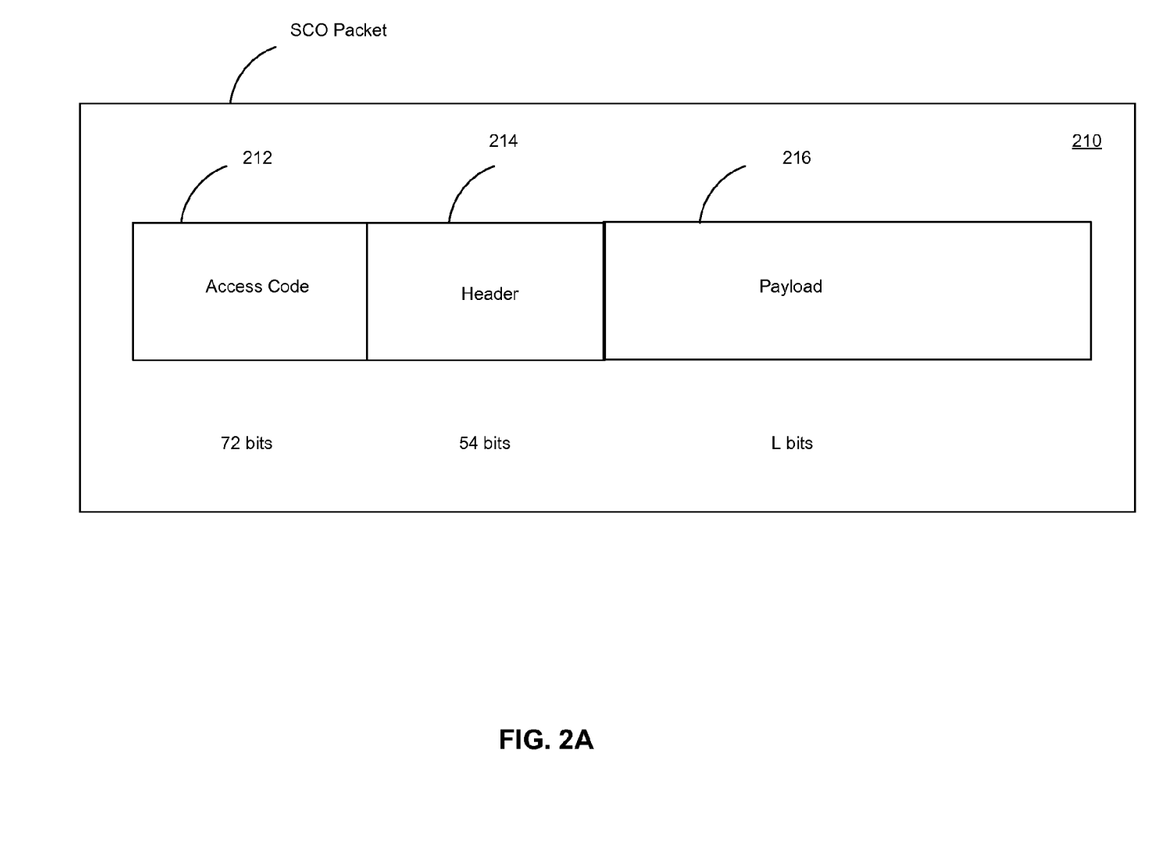
FIG. 2A is a block diagram that illustrates an exemplary Bluetooth SCO packet, in accordance with an embodiment of the invention.

FIG. 2A is a block diagram that illustrates an exemplary Bluetooth SCO packet, in accordance with an embodiment of the invention. Referring to FIG. 2A, there is shown a SCO packet 210. The SCO packet 210 may comprise an access code 212, a header 214, and a payload 216. The access code 212 may be used to detect the presence of a packet and to address the packet to a Bluetooth device in a specific Bluetooth piconet. The header 214 may comprise control information associated with the SCO packet 210 and the SCO link 120, for example, the address of the Bluetooth stereo headset (the slave) 100b, for which the SCO packet 210 may be intended. The SCO packet payload 216 may comprise the actual message information of L bits transmitted over the SCO link 120. In accordance with various embodiments of present invention, the payload size, L, may be adaptively adjusted based on service type and/or service activity level in corresponding direction of the SCO link 120. For example, during a voice call over the SCO link 120, when a silence period may be detected for the user of the Bluetooth stereo headset (the slave) 100b, the SCO packet payload 216 in the slave-to-master direction of the SCO link 120 may comprise a small amount of information such as a noise signature during the silent period and the payload size, L, of the corresponding SCO packets may be reduced accordingly. In this regard, number of bits in the SCO packet payload may be selected adaptively according to the voice activity level in the corresponding direction of the SCO link 120.

Figure 2B:
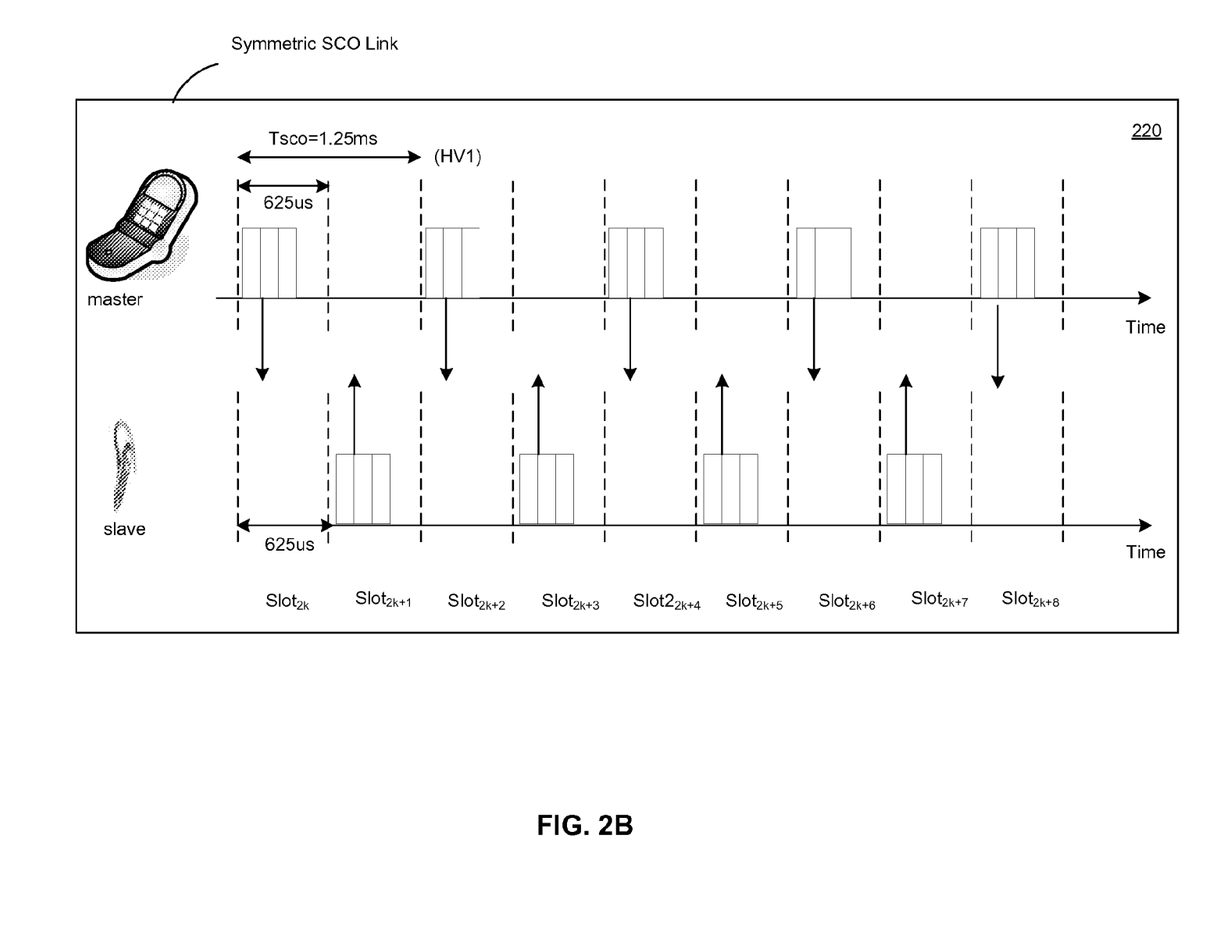
FIG. 2B is a block diagram that illustrates an exemplary Bluetooth symmetric SCO link, in accordance with an embodiment of the invention.

FIG. 2B is a block diagram that illustrates an exemplary Bluetooth symmetric SCO link, in accordance with an embodiment of the invention. Referring to FIG. 2B, there is shown a symmetric SCO link 220. The symmetric SCO link 220 as defined in the Bluetooth specification may provide a symmetric link between the Bluetooth enabled cell phone (the master) 100a and the Bluetooth stereo headset (the slave) 100b with reserved channel bandwidth and regular periodic exchanges of data in the form of reserved slots. The symmetric SCO link 220 may support the determined master-to-slave slots and the determined slave-to-master slots with fixed length of the SCO packet payload 216. The SCO packets in each direction over the symmetric SCO link 220 may be transmitted at regular SCO interval Tsco. For example, the SCO interval Tsco may be selected as 2 slots, 4 slots, or 6 slots depending on the type of SCO packet such as HV1 or HV2 or HV3 used. A fixed SCO interval Tsco may be applied once the SCO packet type may be determined. A similar amount of bandwidth may be allocated in both directions of the symmetric SCO link 220 during the SCO connection. The Bluetooth enabled cell phone (the master) 100a or the Bluetooth stereo headset (the slave) 100b may be allowed to transmit its SCO packets periodically in corresponding reserved slots with a fixed Tsco and a fixed SCO packet payload 216 even if, for example, the corresponding user such as the Bluetooth stereo headset user may be in a silent period.

Figure 2C:
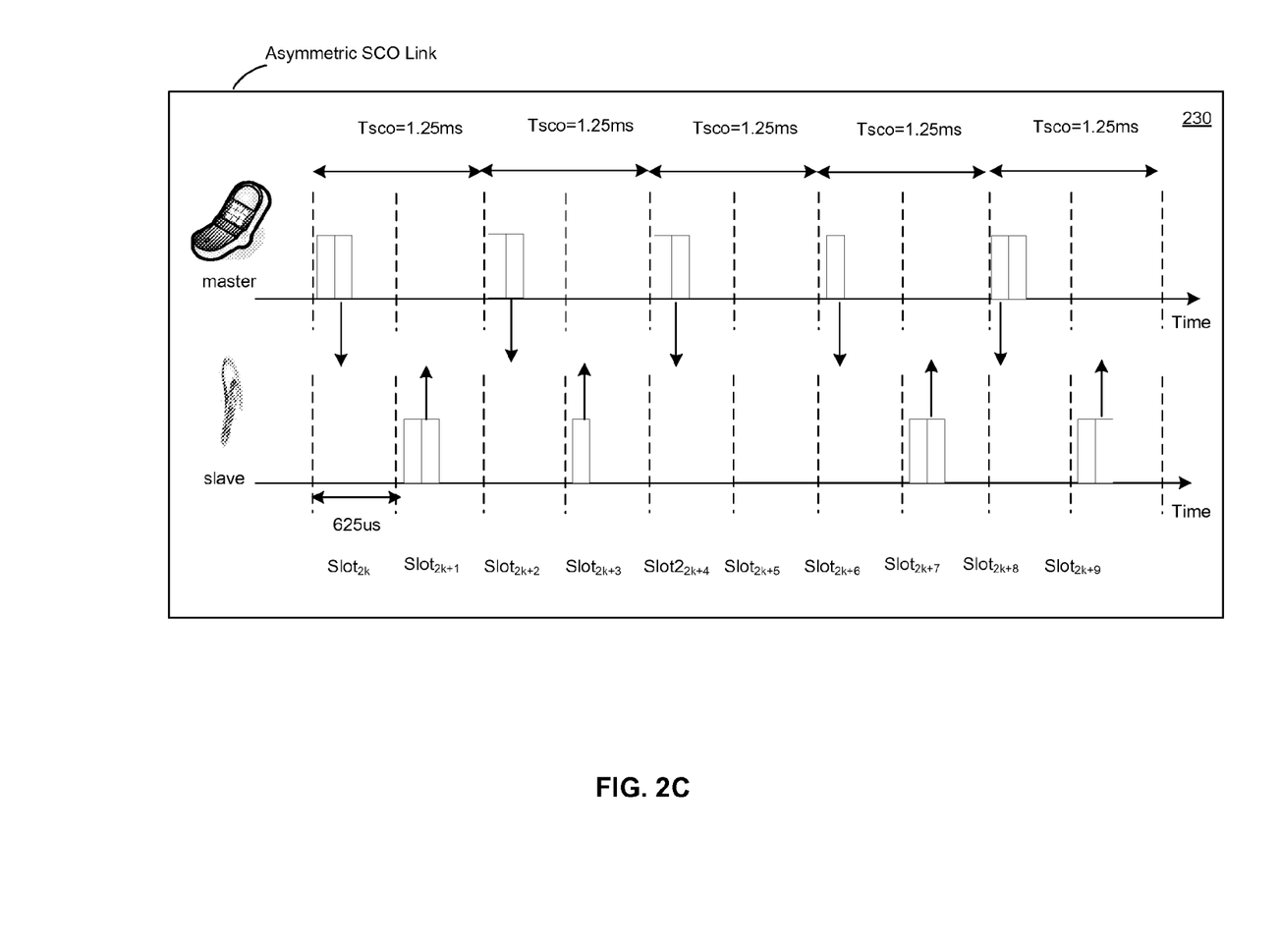
FIG. 2C is a block diagram that illustrates an exemplary Bluetooth asymmetric SCO link, in accordance with an embodiment of the invention.

FIG. 2C is a block diagram that illustrates an exemplary Bluetooth asymmetric SCO link, in accordance with an embodiment of the invention. Referring to FIG. 2C, there is shown an asymmetric SCO link 230. The asymmetric SCO link 230 may provide an asymmetric link between the Bluetooth enabled cell phone (the master) 100a and the Bluetooth stereo headset (the slave) 100b. The SCO link 120 may be dynamically managed according to service type and service activity level in each direction of the SCO link 120. In this regard, for example, during a voice call, the Bluetooth enabled cell phone (the master) 100a may have access to the information of voice activity level in each direction of the SCO link 230. The Bluetooth enabled cell phone (the master) may determine the associated SCO parameters required for each direction of the SCO link 230, for example, the master-to-slave slots and/or slave-to-master lots, SCO packet sizes, and Tsco, based on the voice activity level in both directions of the SCO link 230. The SCO link 230 may be modified based on the selected SCO parameters. Once the SCO link 230 may be confirmed by both sides of the SCO link 230, the modified SCO link 230 may be utilized to carry voice traffic. For example, the Bluetooth enabled cell phone (the master) 100a may transmit its first SCO packet addressed to the Bluetooth stereo headset (the slave) 100b in an even numbered time slot such as slot 2k, where k may be a slot index number. The Bluetooth stereo headset (the slave) 100b may respond the master 100a with a SCO packet in slot 2k+1. The SCO link 230 may be dynamically adjusted depending the vice activity level information received by the Bluetooth enabled cell phone (the master) 100a.

In instances where a lower voice activity level may occur in the slave-to-master direction of the SCO link 230, the SCO packet size assigned the Bluetooth stereo headset (the slave) 100b may be reduced and the SCO link 230 may be adjusted accordingly. The Bluetooth stereo headset (the slave) 100b may transmit its small size SCO packet in a reserved slot, for example, the slot 2k+3. In certain circumstances where the user of, for example, the Bluetooth stereo headset (the slave) 100b, may be silent, there may be no need to send a SCO packet to the Bluetooth enabled cell phone (the master) 100a. The Bluetooth enabled cell phone (the master) 100a may assign a small SCO packet size to the Bluetooth stereo headset (the slave) 100b if, for example, silent packets may need to be transmitted during the silence. There may be instances when both sides of the SCO link 230 agree that there will be no transmission of silent packets during a silent period such as in slot 2k+5. In slot 2k+6, due to a less voice activity level in the master-to-slave direction of the SCO link 230, the Bluetooth cell phone (the master) 100a may send its SCO packets via a reduced size packet. Transmission opportunities and bandwidth required for each direction of the SCO link may be updated per corresponding activity levels. For example, the Bluetooth stereo headset (the slave) 100b may be issued transmission opportunities, slot 2k+7 when the user may start speaking again after the silence.

In certain circumstances, when the user of, for example, the Bluetooth stereo headset (the slave) 100b, may receive certain type of service such as a FM radio from the Bluetooth enabled cell phone 9 the master) 100a. In this regard, half of the SCO link 120 may not be needed. The Bluetooth enabled cell phone (the master) 100a and the Bluetooth stereo headset (the slave) 100b may agree that no slave-to-master SCO packets transmission will be allocated, or less number of the slave-to-master SCO packets will be allocated compared to the number of the master-to-slave SCO packets, or various different sizes of the allocated slave-to-master SCO packets may be assigned compared to the size assigned to the respective master-to-slave SCO packets. In instances when a user may be listening to the FM radio over the Bluetooth link of the Bluetooth stereo headset (the slave) 100b, the slave-to-master transmission opportunities may be set to zero or at least reduced. The Bluetooth stereo headset (the slave) 100b may shut down one half of the SCO link to save power on the Bluetooth stereo headset (the slave) 100b. This may also reduce interference level on the Bluetooth enabled cell phone (the master) 100a.

Figure 3:
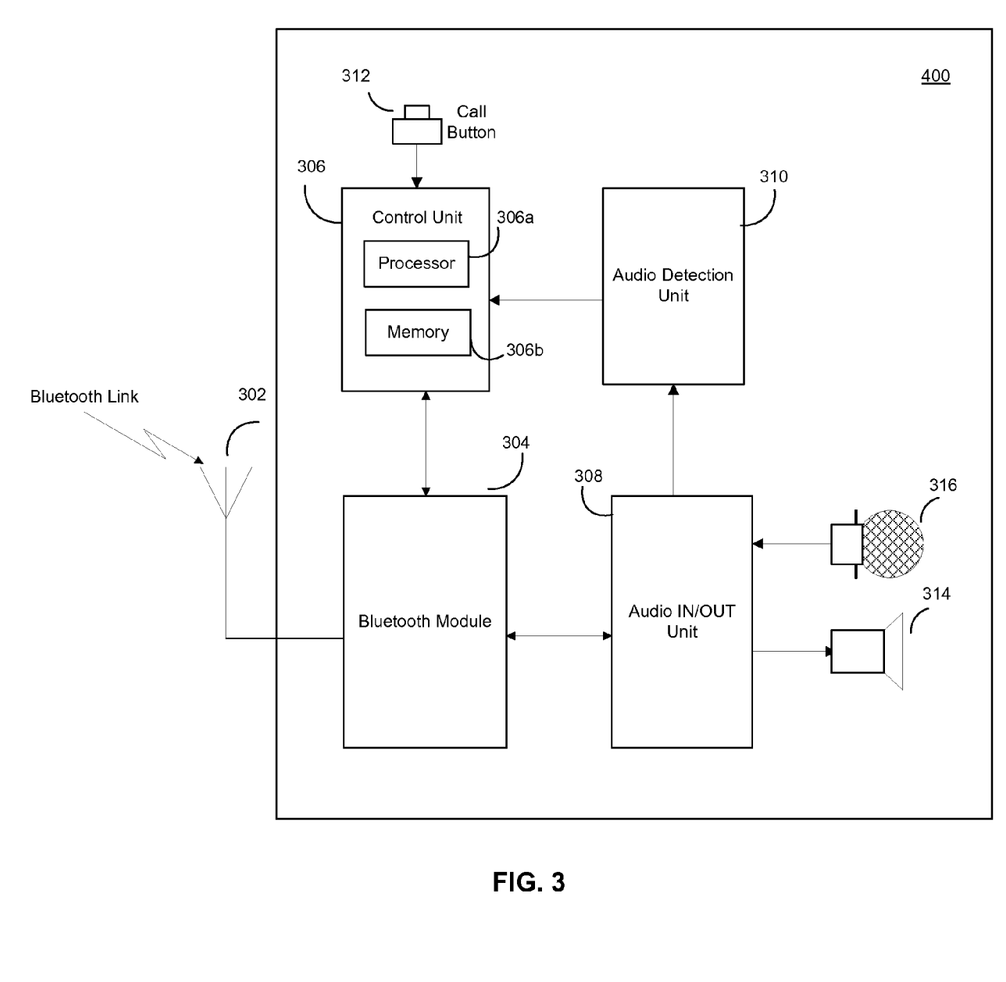
FIG. 3 is a block diagram illustrating an exemplary configuration of a Bluetooth device, in accordance with an embodiment of the invention.

FIG. 3 is a block diagram showing an exemplary configuration of a Bluetooth device, in accordance with an embodiment of the invention. Referring to FIG. 3, there is shown an antenna 302, a Bluetooth module 304, a control unit 306, an audio IN/OUT unit 308, an audio detection unit 310, a call button 312, a loud speaker 314, and a microphone 316. The control unit 306 may comprise a processor 306a and a memory 306b.

The antenna 302 may comprise suitable logic circuitry and/or code that may be used to transmit/receive a radio wave in the 2.4-GHz band, as a frequency band used by the Bluetooth radio communication system for communications with another Bluetooth device.

The Bluetooth module 304 may comprise suitable logic, circuitry and/or code that may be enabled to support data delivery over the Bluetooth air-interface. The Bluetooth module 304 may generally be partitioned into a Bluetooth RF to generate wireless channels for data transmission and a Bluetooth baseband to execute link management tasks, link control tasks, and bitstream processing. The Bluetooth module 304 may typically comprise a high-frequency processor connected to the antenna 302, a hopping frequency calculator for calculating the hopping frequency, a baseband signal processor for controlling transmit packets and the radio communications link, as well as processing error correction of a transmit signal and security control, a storage part such as a flash memory, and a CPU part for performing general control of the foregoing parts.

The control unit 306 may comprise suitable logic, circuitry and/or code that may be used to control operations of the Bluetooth device 300. The processor 306a may comprise suitable logic, circuitry and/or code that may provide control instructions for processing received signals and enable various Bluetooth peer-to-peer communications based upon the operating environment. The memory 306b may comprise suitable logic, circuitry and/or code that may enable storing information such as executable instructions and data that may be utilized by the processor 306a. The memory 306b may be RAM, ROM, low latency nonvolatile memory such as flash memory and/or other suitable electronic data storage. An application program in the Bluetooth device 300 may be stored in the memory 306b and may be executed on the processor 306a. When the Bluetooth module 304 in the Bluetooth device 300 may be controlled by the control unit 306, a general-purpose interface such as RS-232C and UART may be used. Specifications for communication over the general-purpose interface may be specified as HCI (Host Controller Interface) in the Bluetooth specifications.

The loud speaker 314 may comprise suitable logic, and/or circuitry that may broadcast audio signals received.

The microphone 316 may comprise suitable logic, circuitry and/or code that may be used to receive audio signals such as user's voice.

The audio IN/OUT unit 312 may comprise suitable logic circuitry of for example a voice codec (coder/decoder) and/or code that may perform analog-to-digital conversion of an audio signal and may provide a resulting digital signal to convey voice activations to the Bluetooth module 304. The audio IN/OUT unit 308 may perform digital-to-analog conversion of voice data received from the Bluetooth module 304, and may provide a regenerated output of a resulting signal to the loudspeaker 314.

The audio detection unit 310 may comprise suitable logic circuitry and/or code that may be enabled to detect whether an audio signal may be present or absent in either the audio input part or audio output part of the audio IN/OUT unit 308. Detection of an audio signal may be made on an analog audio signal or a digital audio signal. Exemplary voice activity detection mechanisms may comprise feature extraction using beamforming, classification using discriminant analysis, or just simply comparing the audio signal strength with a threshold. For example, a voice activity may be measured by extracting meaningful keywords and counting their frequency, and/or evaluating associated set of spectral features, and/or analyzing specific set of psychoacoustic features such as pitch and loudness. The detected voice activity may be quantized to an integer number indicating so-called a voice activity level. A predetermined margin may be provided on the detection level and the duration of an audio signal to be detected, in order to prevent detection error caused by a noise. The audio detection unit 310 may generate and transfer information on the presence/absence of an audio signal to the control unit 306, on a regular basis or at every change point of detection or non-detection of an audio signal.

The call button 312 may comprise suitable logic, circuitry and/or code that may enable users to activate or deactivate voice transmission from the user via the SCO link 120 by turning the call button 316 ON or OFF. The call button 312 may be a soft button or a hard button. For example, while the call button 312 may be activated, that is, the call button 312 may be turned ON, a voice from the user of, for example, the Bluetooth stereo headset (the slave) 100b may be transmitted over the SCO link to the Bluetooth enabled cell phone (the master) 100a. Once the call button 312 gets released, that is, the call button 312 may be turned OFF or deactivated, it may be assumed that the user may wish to temporarily suspend voice transmission.

Both Bluetooth devices in the Bluetooth point-to-point communication may not need to be configured to control detection of the presence/absence of an audio signal being transmitted on the SCO link 230 and/or modify of the SCO link 230. Such a configuration may be required when either one of the two Bluetooth enabled devices, in this example, the Bluetooth stereo headset (the slave) 100b is illustrated with the configuration according to the embodiment.

In operation, in instances where a voice signal may be generated and transmitted from the Bluetooth-enabled cell phone (the master) 100a, the antenna 302 may receive a RF signal from the Bluetooth-enabled cell phone (the master) 100a in the 2.4 GHz band. The received RF signal may be communicated to the Bluetooth module 304, where it may be processed by the Bluetooth module 304. The Bluetooth module 304 may then convert the received RF signal into SCO packets by applying, for example, a demodulation process and a channel decoding process. The LMP 106b in the Bluetooth module 304 may check the SCO packets based on, for example, link configuration settings, and may input the resulted SCO packets to the audio IN/OUT unit 308. The audio IN/OUT unit 308 may partition the received SCO packets to plurality voice packets. The audio codec 104b in the audio IN/OUT unit 308 may decode the voice packets to create an audio signal to the loud speaker 314. The speaker 314 may convert the resulting received audio signal to an audible signal.

The presence or absence of the audio signal at the audio IN/OUT unit 308 may be detected by the audio detector 406 and the corresponding voice activity level may be passed to the control unit 306. The control unit 306 may signal the Bluetooth module 304 with the voice activity level in both directions of the SCO link 230 associated to the stereo headset. A message containing the voice activity information may be transmitted to the Bluetooth enabled cell phone (the master) 100a. The LMP 106a associated to the Bluetooth-enabled cell phone (the master) 100a may assess the received voice activity information of the current SCO link 230. A set of SCO link parameters such as Tsco, reserved slots, and SCO packet size in each direction of the SCO link 230 may be determined accordingly. The set of the SCO link parameters may be negotiated and confirmed by both the Bluetooth-enabled cell phone (the master) 100a and the Bluetooth stereo headset (the slave) 100b. The SCO link 230 may be modified accordingly. The voice communication may then continue over the modified SCO link 230.

In operation, in instances where a user of the Bluetooth stereo headset (the slave) 100b may want to speak to the user of the Bluetooth enabled cell phone (the master) 100a, the microphone 316 may be connected to the Bluetooth stereo headset (the slave) 100b. When the user of the Bluetooth stereo headset (the slave) 100b starts talking, the microphone 316 may pick up the voice input (voice prompt) and may generate a corresponding electrical signal to the audio IN/OUT unit 308. The audio codec 104b in the audio IN/OUT unit 308 may encode the received voice signal from the microphone 316 and generate a plurality of output voice packets in a format supported by Bluetooth. The audio IN/OUT unit 308 may reassemble the resulting voice packets to SCO packets and pass them to the Bluetooth module 304. The SCO packets may be checked based on the link configuration by, for example, the LMP 106b in the Bluetooth module 304. The resulting SCO packets may be coded and/or modulated to a RF signal. The RF signal may be transmitted to the Bluetooth-enabled cell phone (the master) 100a by the antenna 302 accordingly. The presence or absence of the audio signal at the audio IN/OUT unit 308 may be detected by the audio detector 310.

Various voice activity detection mechanisms may be used such as feature extraction using beamforming and classification using discriminant analysis, or just simply comparing the audio signal strength with a threshold. The detected voice activity may be quantized to an integer number indicating a voice activity level. The audio detection unit 310 may communicate the voice activity level to the control unit 306. The control unit 306 may notify the Bluetooth module 304 of the voice activity level in both directions of the SCO link 120 associated to the Bluetooth stereo headset (the slave) 100b. A message comprising the voice activity level may be transmitted to the Bluetooth enabled cell phone (the master) 100a. The LMP 106a associated with the Bluetooth-enabled cell phone (the master) 100a may assess the received voice activity information of the current SCO link and a set of SCO link parameters comprising, for example, Tsco, reserved slots, SCO packet size in each direction of the SCO link may be determined accordingly. The set of the SCO link parameters may be negotiated and confirmed by both the Bluetooth-enabled cell phone (the master) 100a and the Bluetooth stereo headset (the slave) 100b. The SCO link 230 may be modified accordingly. The voice communication may then continue over the modified SCO link 230.

In an alternative embodiment of the invention, the control unit 306 may be informed of the status of the voice activity in the slave-to-master direction of the SCO link 230 via the call button 312. In instances where in a push-to-talk like environment, the user of the Bluetooth stereo headset (the slave) 100b may want to speak to the user of the Bluetooth-enabled cell phone (the master) 100a, the user of the Bluetooth stereo headset (the slave) 100b may press or otherwise activate the call button 312. As long as the call button 312 remains activated, a voice from the user of the Bluetooth stereo headset (the slave) 100b may be transmitted to the Bluetooth-enabled cell phone (the master) 100a. The control unit 306 may be enabled to extract the contact signal ON/OFF information from the call button 312 into control unit 306. For example, the control unit 306 may comprise a predetermined latch circuit as required. As soon as the call button 312 gets deactivated, it may be assumed that the user may wish to temporarily suspend voice transmission to the Bluetooth-enabled cell phone. The control unit 306 may signal the Bluetooth module 304 with the voice activity information from the call button 312. A message containing the voice activity information may be transmitted to the Bluetooth enabled cell phone (the master) 100*a*. The LMP 106*a* associated to the Bluetooth-enabled cell phone (the master) 100*a* may assess the received voice activity information of the current SCO link 230. No time slots or less time slots may be reserved for the Bluetooth stereo headset (the slave) 100*b* while the call button 312 remains deactivated (OFF).

In instances where the call button 312 may remain activated by, for example, not being released after being pressed down, or the call button 312 may be activated by being pressed down/turned ON, the user may indicate to continue or start voice transmission to the Bluetooth enabled cell phone (the master) 100*a*, respectively. The control unit 306 may signal the Bluetooth module 304 with the voice activity information from the call button 312. A message containing the voice activity information may be transmitted to the Bluetooth enabled cell phone (the master) 100*a*. The LMP 106*a* associated to the Bluetooth-enabled cell phone (the master) 100*a* may assess the received voice activity information of the current SCO link 230. Time slots may be reserved for the Bluetooth stereo headset (the slave) 100*b* while the call button 312 is held down (ON) or activated. The audio codec 104*b* in the audio IN/OUT unit 308 may encode the voice signal from the microphone 316 and output voice packets in a format supported by Bluetooth. The audio IN/OUT unit 308 may reassemble the resulted voice packets to SCO packets and pass them to the Bluetooth module 304. Whenever the call button 312 may be held down (ON) or activated, the SCO link 230 may automatically try to send the corresponding audio SCO packets over the SCO link 230. Depending on the system capacity and the ON/OFF status of the call button 312, the SCO link parameters such as Tsco and SCO packet size may be modified accordingly. The SCO link 230 may be automatically adjusted for no slots or less slots or longer Tsco being polled for the uplink voice traffic. For example, the SCO link 230 may be switched between full duplex and half duplex.

Figure 4:
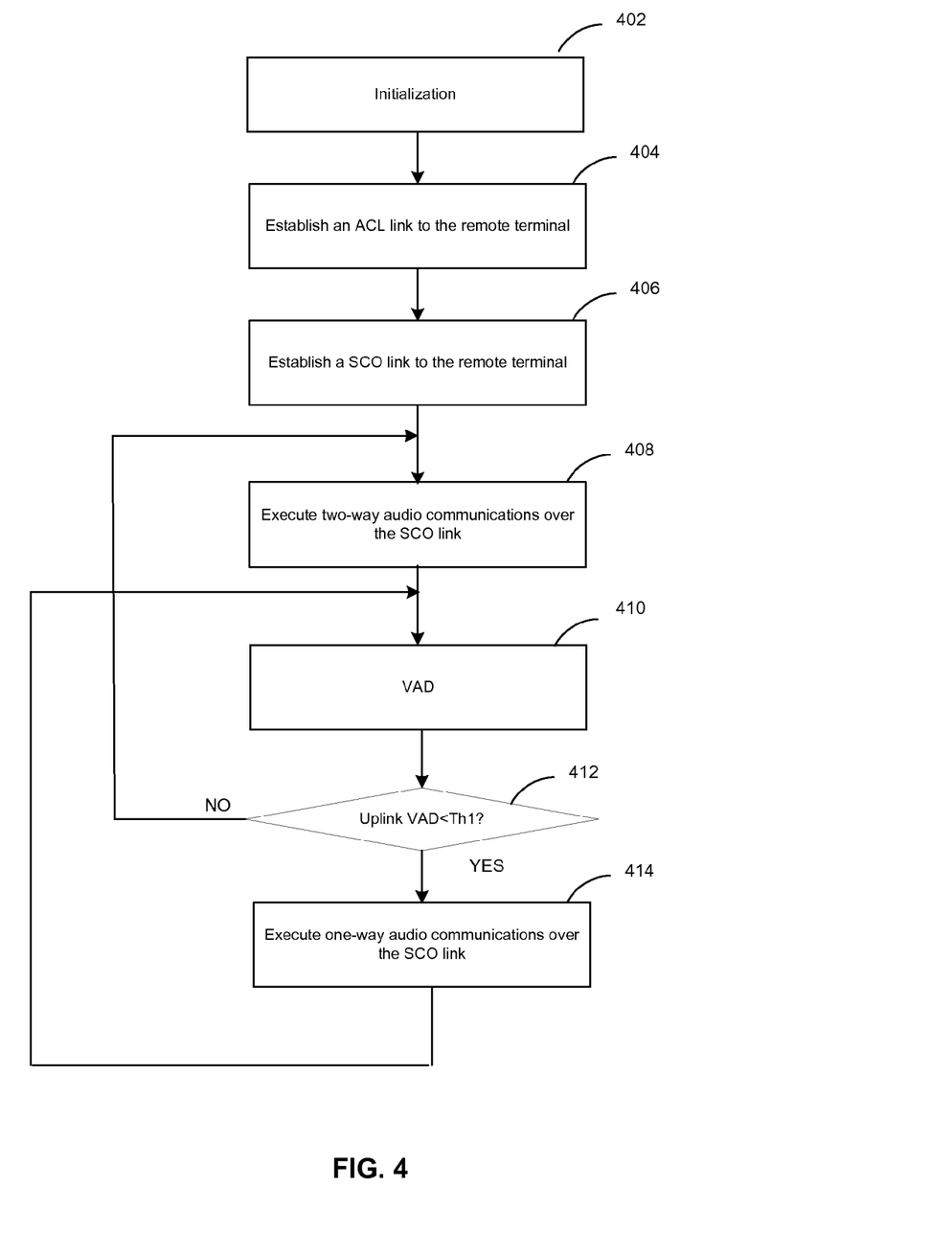
FIG. 4 is a flow chart that illustrates exemplary steps for switching between full duplex audio and half duplex audio in a Bluetooth stereo headset, in accordance with an embodiment of the invention.

FIG. 4 is a flow chart that illustrates exemplary steps for switching between full duplex audio and half duplex audio in a Bluetooth stereo headset, in accordance with an embodiment of the invention. Referring to FIG. 4, the exemplary steps begin in step 402, where the Bluetooth stereo headset (the slave) 100*b* may be initialized to active slave mode waiting for a connection request. In step 404, an ACL link may be established to exchange various control information through LMP 106 between the Bluetooth stereo headset and a remote terminal such as the Bluetooth enabled cell phone (the master) 100*a*. In step 406, the SCO link 230 may be established over the ACL link between the Bluetooth stereo headset (the slave) 100*b* and the Bluetooth enabled cell phone (the master) 100*a*. In step 408, two-way audio communications such as a voice call, between the Bluetooth stereo headset (the slave) 100*b* and the Bluetooth enabled cell phone (the master) 100*a* may start via the SCO link 230. In step 410, the presence or absence of voice may be detected. In this regard, the audio activity detection unit 310 or the call button 312 may be used depending on specific application environment. The voice activity level may be passed to the control unit 306.

In step 412, the uplink voice activity level may be compared with a threshold. In instances where the detected uplink voice activity level may be less than the threshold, which may indicate that no uplink voice traffic may be needed based on the voice activity information received from the voice activity detection 310 or the call button 312, then in step 414, the control unit 306 may signal the Bluetooth module 304 for switching the SCO link 120 from a full duplex mode to a half duplex mode. The SCO link 230 may be modified and confirmed by both the Bluetooth stereo headset (the slave) 100*b* and the Bluetooth-enabled cell phone (the master) 100*a*. A one-way audio communication, from the Bluetooth-enabled cell phone (the master) 100*a* to the Bluetooth stereo headset (the slave) 100*b*, may be executed over the modified SCO link 230. The next step may be step 410. In instances where the detected uplink voice activity level may be greater than the threshold, which may indicate a need to continue or start the uplink voice traffic, then in step 408, the control unit 306 may signal the Bluetooth module 304 for the full duplex SCO link 230. The SCO link 230 may be modified and confirmed by both the Bluetooth stereo headset and the Bluetooth-enabled cell phone. A two-way audio communication may be executed over the modified SCO link 230.

Figure 5:
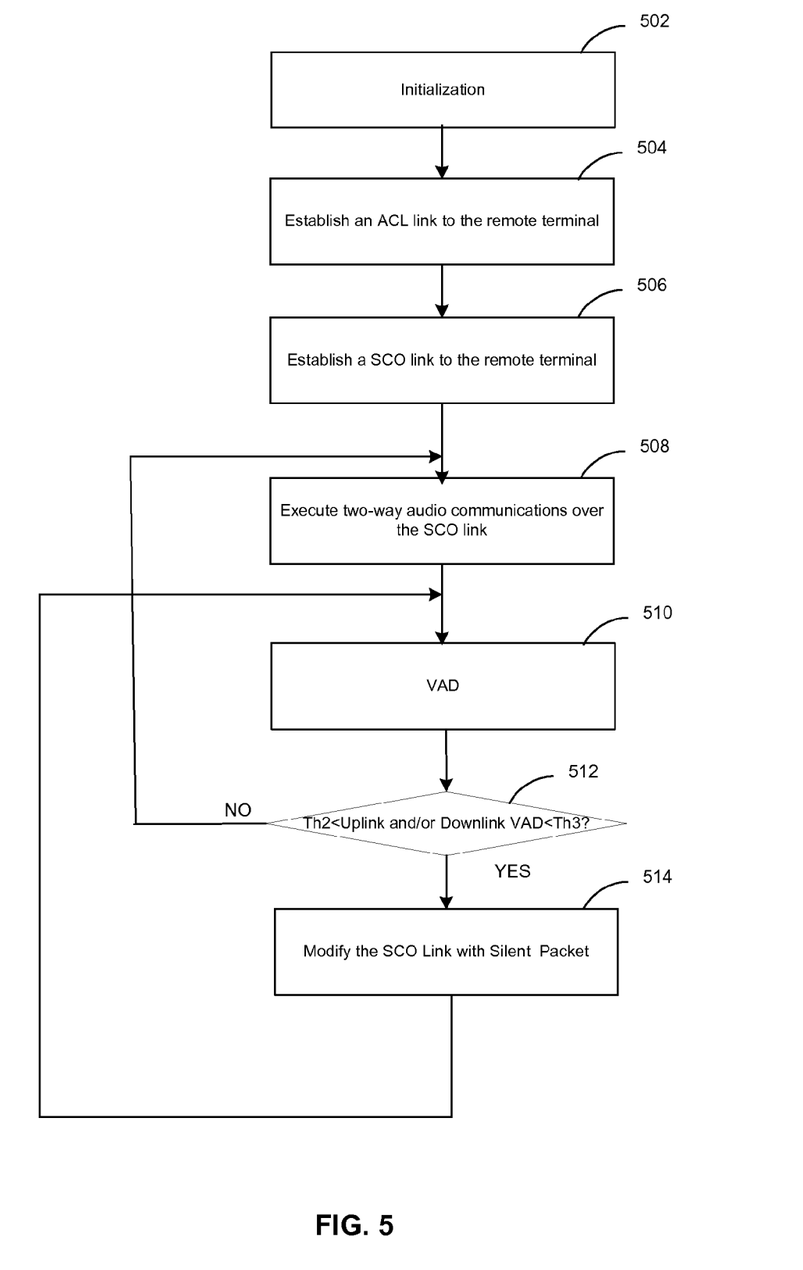
FIG. 5 is a flow chart that illustrates exemplary steps for inserting silent packets in Bluetooth point-to-point communication over a SCO link, in accordance with an embodiment of the invention.

FIG. 5 is a flow chart that illustrates exemplary steps for inserting silent packets in Bluetooth point-to-point communication over a SCO link, in accordance with an embodiment of the invention. Referring to FIG. 5, the operation shown in the flowchart of FIG. 5 may be similar to the processing disclosed with respect to FIG. 4. The differences are those in step 512 and step 514. In step 512, both uplink and downlink voice activity level may be compared with a threshold, respectively. In instances where at least one detected voice activity level may be less than the threshold, which may indicate that the corresponding direction may be in silence, then in step 514, the control unit 306 may signal the Bluetooth module 304 to allocate time slots for silent packets in the corresponding traffic direction of the SCO link 230. In this regard, the silent SCO packet may comprise a noise signature or just noise data. The SCO link 230 may be modified and confirmed by both the Bluetooth stereo headset (the slave0 100*b* and the Bluetooth-enabled cell phone (the master) 100*a*. Communication between the Bluetooth-enabled cell phone (the master) 100*a* and the Bluetooth stereo headset (the slave) 100*b* may continue over the modified SCO link 230.

Figure 6:
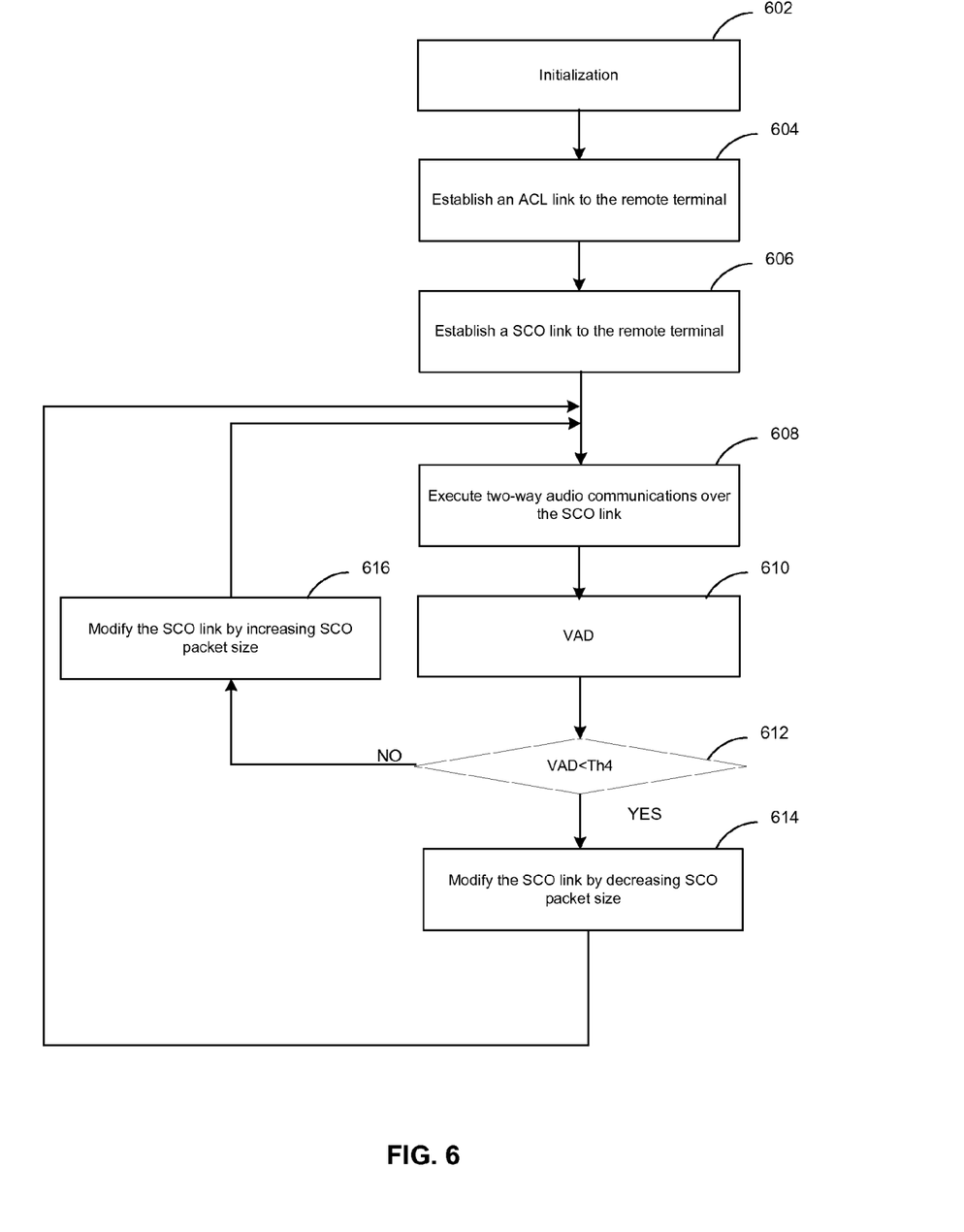
FIG. 6 is a flow chart that illustrates exemplary steps for adaptively adjusting a SCO packet size in Bluetooth point-to-point communication over a SCO link, in accordance with an embodiment of the invention.

FIG. 6 is a flow chart that illustrates exemplary steps for adaptively adjusting a SCO packet size in Bluetooth point-to-point communication over a SCO link, in accordance with an embodiment of the invention. Referring to FIG. 6, the operation shown in the flowchart of FIG. 6 may be similar to the processing disclosed with respect to FIG. 5. The differences are those after the step 612. In step 612, the voice activity level in both directions of the SCO link 230 may be compared with a threshold, respectively. In instances where at least one detected voice activity level may be less than the threshold, which may indicate that the corresponding direction may have a reduced traffic volume, then in step 614, the SCO size assigned to the corresponding direction transmission over the SCO link 230 may be reduced. The next step may be step 608. In instances where at least one detected voice activity level may be greater than the threshold, which may indicate that the corresponding direction may have an increased traffic volume, then in step 616, the SCO size assigned to the corresponding direction of transmission over the SCO link 120 may be increased. The next step may be step 608.

Figure 7:
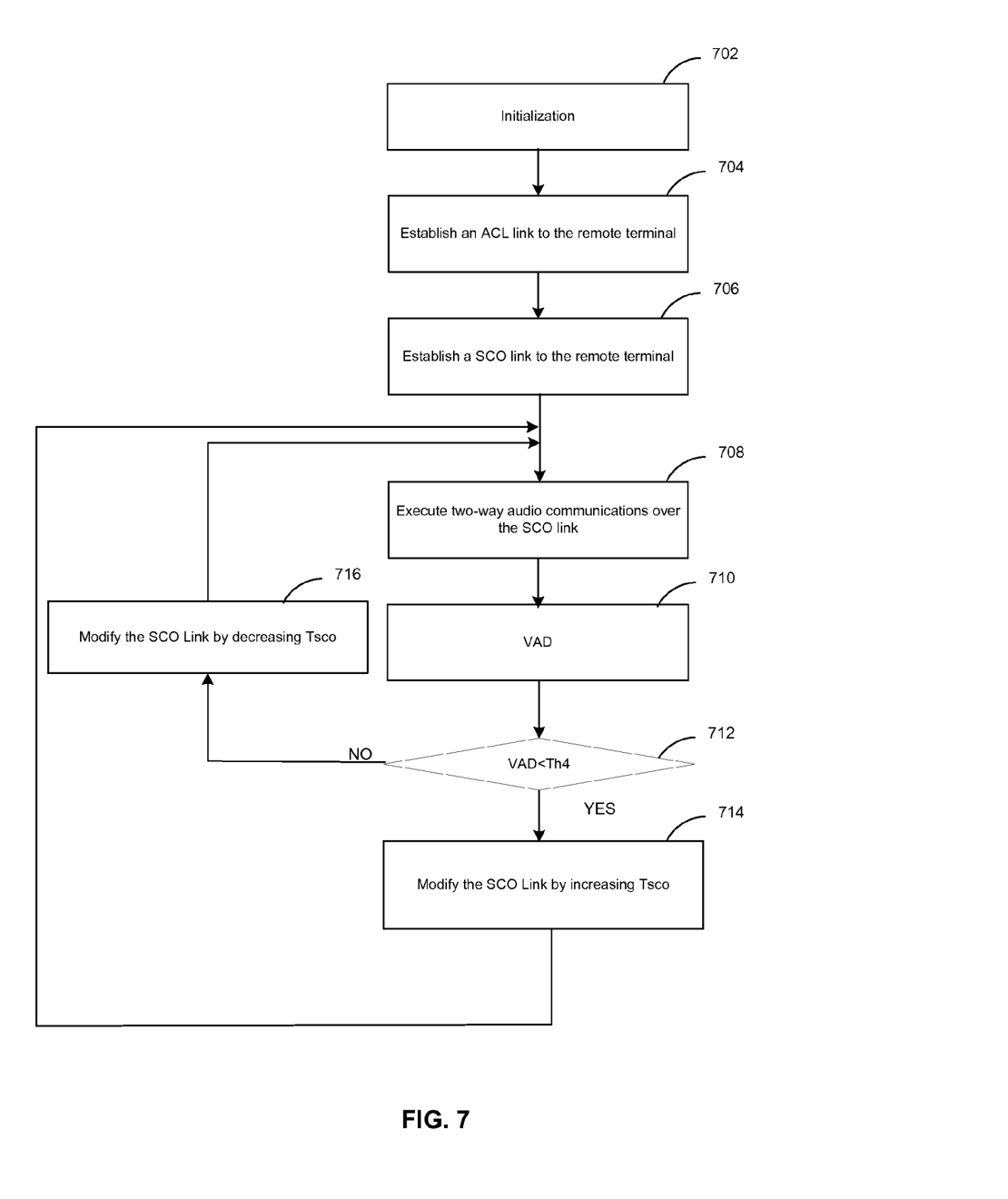
FIG. 7 is a flow chart that illustrates exemplary steps for adaptively adjusting a SCO interval in Bluetooth point-to-point communication over a SCO link, in accordance with an embodiment of the invention.

FIG. 7 is a flow chart that illustrates exemplary steps for adaptively adjusting a SCO interval in Bluetooth point-to-point communication over a SCO link, in accordance with an embodiment of the invention. Referring to FIG. 7, the operation shown in the flowchart of FIG. 7 is may be similar to the processing disclosed with respect to FIG. 6. The differences are those in step 714 and step 716. In step 712, the voice activity level in both directions of the SCO link 120 may be compared with the threshold of Th4, respectively. In instances where at least one detected voice activity level may be less than the threshold, then in step 714, the SCO interval Tsco assigned to the SCO link 230 may be reduced. The next step may be step 708. In instances where at least one detected voice activity level may be greater than the threshold, which may indicate that the corresponding direction may have an increased traffic volume, then in step 716, the SCO interval Tsco assigned to the SCO link 230 may be increased accordingly. The next step may be step 708.

Aspects of a method and system for dynamically managing a SCO link in a Bluetooth enabled device such as a Bluetooth stereo headset 100b are provided. In accordance with various embodiments of the invention, the service type and/or the service activity levels may be detected over a link in a duplex communication system. The link may be dynamically changed according to the detected service activity levels in both directions of the link. The duplex communication system may be a communication system capable of supporting duplex communication, for example, a Bluetooth system, a 3GPP system, a WiMAX system, or a WiFi system. The link may be a synchronous connection-oriented (SCO) link such as the SCO link 120. The duplex communication system such as the Bluetooth system described with respect to, for example FIG. 1, may be enabled to determine an operating mode, whether symmetric or asymmetric, based on said detected service type and/or said detected service activity levels over the SCO link 120. In this regard, the SCO link 120 may be dynamically switched from symmetric to asymmetric operating mode and vice versa.

An audio activity detector 310 or a call button 312 may be coupled to the Bluetooth stereo headset 100b. The SCO link 230 may be adaptively adjusted according to the detected service activity levels in both directions of the SCO link 120. In this regard, the SCO interval may be increased with a decrease in the detected service activity levels and or the SCO interval may be decreased with an increase in the detected service activity levels. The SCO packet size may be adjusted dynamically based on the detected service activity levels in corresponding direction of the SCO link 230. Moreover, the transmission opportunities may be assigned according to the detected service activity levels in associated direction of the SCO link. Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for half duplex audio in a Bluetooth stereo headset.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in a mobile device:
detecting a service type and associated service activity levels over a link in a duplex communication system;
dynamically changing said link according to said detected service type and said detected associated service activity levels; and
determining a symmetric mode of operation or an asymmetric mode of operation over said link based on said detected service type and said detected associated service activity levels.

2. The method according to claim 1, wherein said duplex communication system is a Bluetooth system, or a 3GPP system, or a WiMAX system, or a WiFi system.

3. The method according to claim 1, wherein said link is a synchronous connection-oriented (SCO) link.

4. The method according to claim 3, comprising dynamically changing a SCO interval of said SCO link according to said detected service type and said detected associated service activity levels.

5. The method according to claim 3, comprising dynamically changing a SCO packet size in a direction of said SCO link according to said detected service type and said detected associated service activity levels.

6. The method according to claim 5, comprising dynamically assigning time slots in said direction of said SCO link according to said detected service type and said detected associated service activity levels.

7. The method according to claim 1, comprising, if a mode of operation is said symmetric mode of operation, dynamically changing said link from said symmetric mode of operation to act said asymmetric mode of operation based on said detected service type and said detected associated service activity levels.

8. The method according to claim 1, comprising, if a mode of operation is said asymmetric mode of operation, dynamically changing said link from said asymmetric mode of operation to said symmetric mode of operation based on said detected service type and said detected associated service activity levels.

9. The method according to claim 1, comprising detecting said associated service activity levels over said link via an audio activity detector.

10. The method according to claim 1, comprising detecting said associated service activity levels over said link via a call button.

11. A system for communication, the system comprising:
one or more circuits for use in a mobile device, said one or more circuits being operable to detect a service type and associated service activity levels over a link in a duplex communication system;
wherein said one or more circuits dynamically modifies said link according to said detected service type and said detected associated service activity levels, and said one or more circuits determines a symmetric mode of operation or an asymmetric mode of operation over said link based on said detected service type and said detected associated service activity levels.

12. The system according to claim 11, wherein said duplex communication system is a Bluetooth system, or a 3GPP system, or a WiMAX system, or a WiFi system.

13. The system according to claim 11, wherein said link is a synchronous connection-oriented (SCO) link.

14. The system according to claim 13, wherein said one or more circuits dynamically changes a SCO interval of said SCO link according to said detected service type and said detected associated service activity levels.

15. The system according to claim 13, wherein said one or more circuits dynamically changes a SCO packet size in a direction of said SCO link according to said detected service type and said detected associated service activity levels.

16. The system according to claim 15, wherein said one or more circuits dynamically assigns time slots in said direction of said SCO link according to said detected service type and said detected associated service activity levels.

17. The system according to claim 11, wherein, if a mode of operation is said symmetric mode of operation, said one or more circuits dynamically changes said link from said symmetric mode of operation to said asymmetric mode of operation based on said detected service type and said detected associated service activity levels.

18. The system according to claim 11, wherein, if a mode of operation is said asymmetric mode of operation, said one or more circuits dynamically changes said link from said asymmetric mode of operation to said symmetric mode of operation based on said detected service type and said detected associated service activity levels.

19. The system according to claim 11, wherein said one or more circuits comprises an audio activity detector operable to detect said associated service activity levels over said SCO link.

20. The system according to claim 11, wherein said one or more circuits detects said associated service activity levels over said link via a call button.

21. A non-transitory computer readable medium having stored thereon, a computer program having at least one code section for communication, the at least one code section being executable by a machine for causing the machine to perform steps comprising:
in a mobile device:
detecting a service type and associated service activity levels over a link in a duplex communication system;
dynamically modifying said link according to said detected service type and detected associated service activity levels; and
determining a symmetric mode of operation or an asymmetric mode of operation over said link based on said detected service type and said detected associated service activity levels.

22. The non-transitory computer readable medium according to claim 21, wherein said duplix communication system is a Bluetooth system, or a 3GPP system, or a WiMAX system, or a WiFi system.

23. The non-transitory computer readable medium according to claim 21, wherein said link is a synchronous connection-oriented (SCO) link.

24. The non-transitory computer readable medium according to claim 23, wherein said at least one code section comprise code for dynamically changing a SCO interval of said SCO link according to said detected service type and said detected associated service activity levels.

25. The non-transitory computer readable medium according to claim 23, wherein said at least one code section comprise code for dynamically changing a SCO packet size in a direction of said SCO link according to said detected service type and said detected associated service activity levels.

26. The non-transitory computer readable medium according to claim 25, wherein said at least one code section comprise code for dynamically assigning time slots in said direction of said SCO link according to said detected service type and said detected associated service activity levels.

27. The non-transitory computer readable medium according to claim 21, wherein said at least one code section comprise code for, if a mode of operation is said symmetric mode of operation, dynamically changing said link from said symmetric mode of operation to act said asymmetric mode of operation based on said detected service type and said detected associated service activity levels.

28. The non-transitory computer readable medium according to claim 21, wherein said at least one code section comprise code for, if a mode of operation is said asymmetric mode of operation, dynamically changing said link from said asymmetric mode of operation to said symmetric mode of operation based on said detected service type and said detected associated service activity levels.

29. The non-transitory computer readable medium according to claim 21, wherein said at least one code section comprise code for detecting said associated service activity levels over said link via an audio activity detector.

30. The non-transitory computer readable medium according to claim 21, wherein said at least one code section comprise code for detecting said associated service activity levels over said link via a call button.

* * * * *